June 27, 1939.  H. P. SMITH  2,164,224
LIFTING MEANS FOR TRACTOR-MOUNTED IMPLEMENTS
Filed Sept. 1, 1937  4 Sheets-Sheet 1
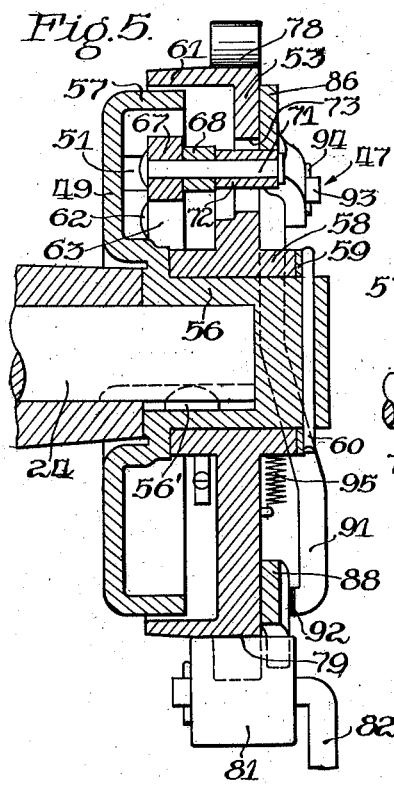
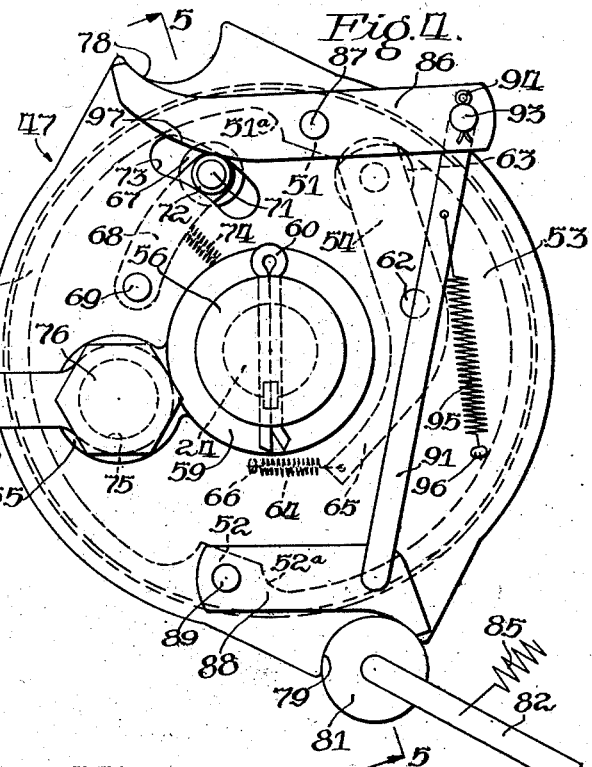
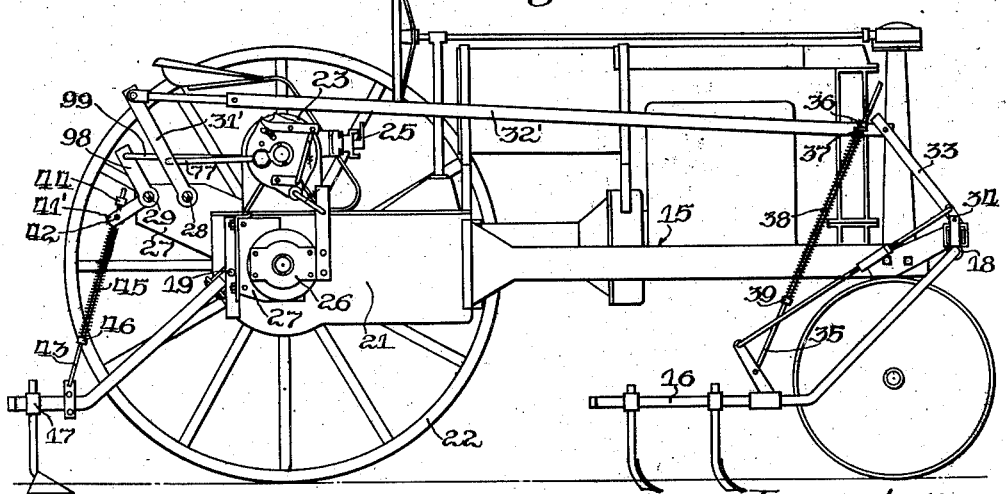
Inventor
Hiram P. Smith
By [signature]
Atty.

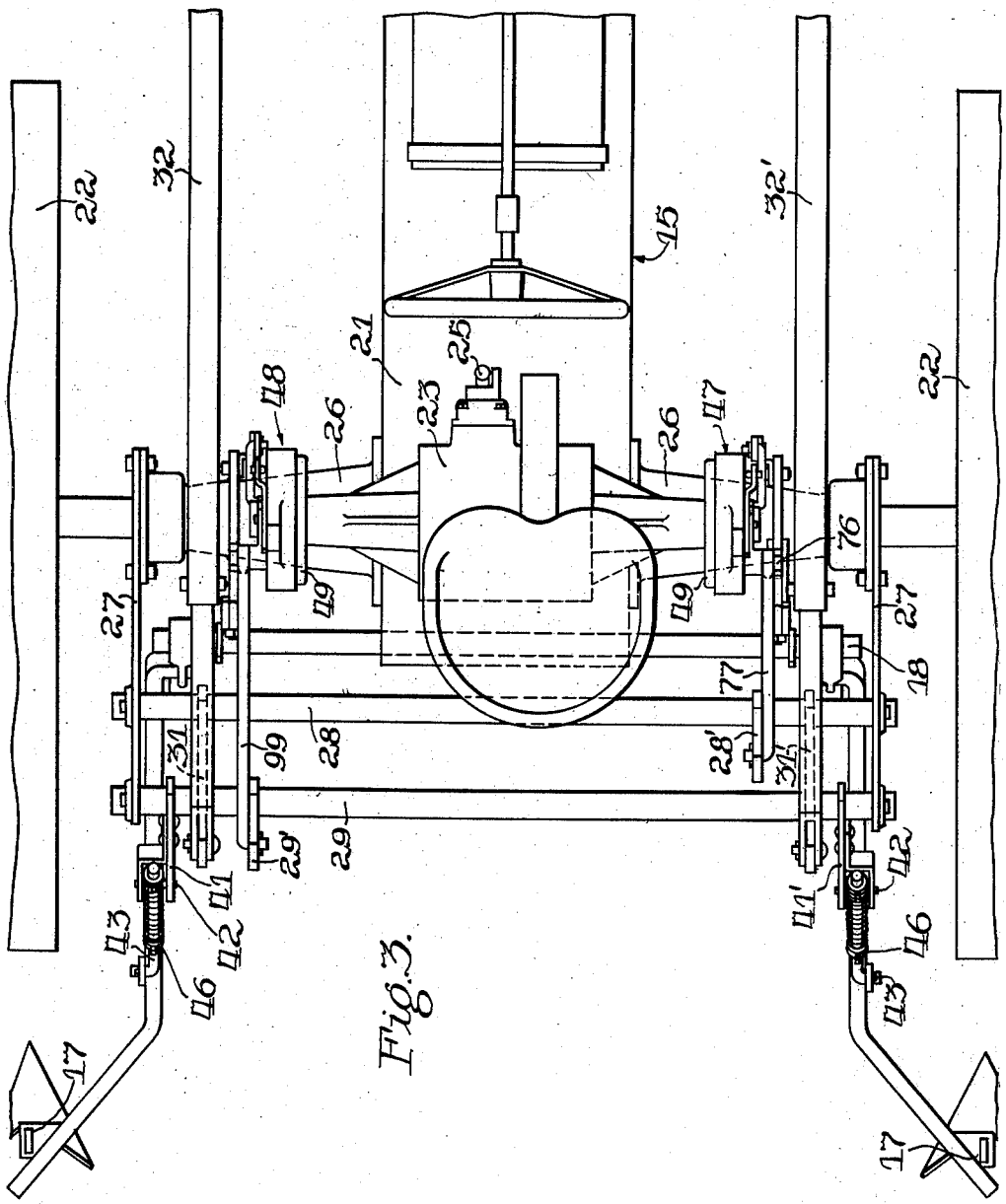

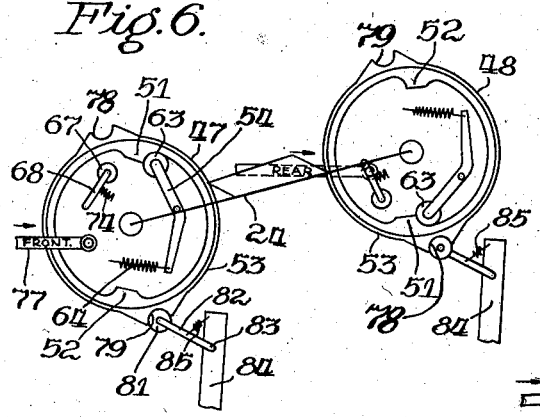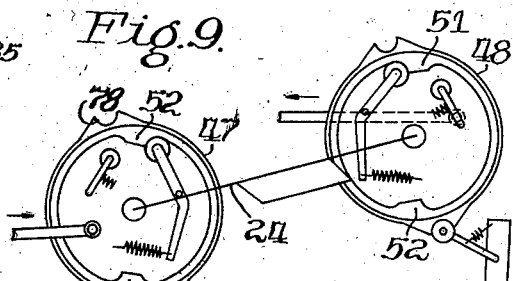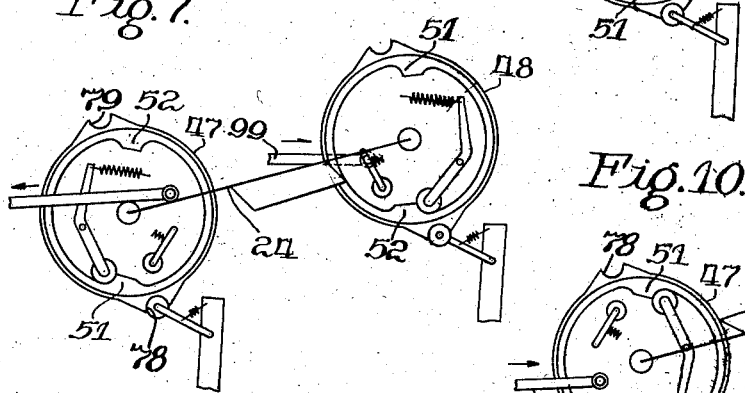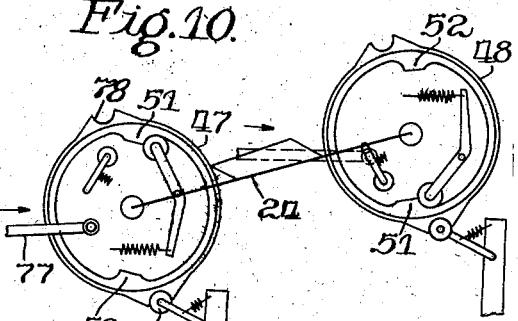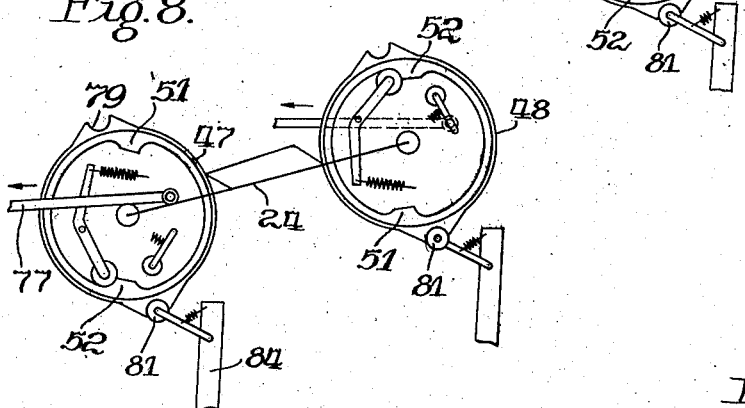

Patented June 27, 1939

2,164,224

UNITED STATES PATENT OFFICE 2,164,224

LIFTING MEANS FOR TRACTOR-MOUNTED IMPLEMENTS

Hiram P. Smith, Canton, Ill., assignor to International Harvester Company, a corporation of New Jersey Application September 1, 1937, Serial No. 161,920

12 Claims. (Cl. 97—50)

This invention relates to tractor mounted implements, and more particularly to lifting means for raising and lowering the implements to and from their ground engaging position.

In tractor mounted implements where there are implements mounted for vertical adjustment on the front of the tractor and implements mounted for vertical adjustment on the rear of the tractor, it is desirable, when starting to cultivate at the beginning of the row and at the end of the row, to have the front implement lowered or raised prior to lowering or raising of the rear implement. By such an arrangement, the front implements are first lowered upon entering the field to be cultivated, and then subsequently the rear implements will be lowered as soon as the rear of the tractor has come into the field; while at the end of the row, the front implements will be raised first and followed by raising of the rear implements. By having the implements arranged for consecutive or alternate operation of the same, the full benefit of both the front and rear implements is obtained. For effecting this alternate operation of implements, a mechanical power lift device taken with the usual half-revolution clutches has been used. The farmer who had only a to and fro hydraulic vane lift, such as shown and described in the patent to E. A. Johnston No. 2,039,801, with this tractor could not obtain this alternate operation of the implements, as the hook-up arrangement with hydraulic vane lift is designed only for joint operation of the implements.

It is, therefore, the object of this invention to provide an arrangement for a hydraulic or to and fro type of power lift whereby alternate operation of the front and rear implements on the tractor can be obtained.

In accomplishing the object of this invention, there has been designed a step-by-step ratchet clutch mechanism which is adapted to be directly connected or mounted on the oscillatory output shaft of the hydraulic or to and fro power lift. There is mounted on the power lift shaft one of these mechanisms for each of the implements adapted to be raised and lowered. The mechanism is somewhat similar in appearance to the usual half-revolution clutch, but operates entirely on a different principle. It may be regarded more as a ratchet mechanism, as its output member, which in turn is connected to the implement, is stepped around only by oscillating movement of the lifting device in one direction. These mechanisms are so mounted with relation to the power lift device that movement of the device in one direction will effect raising or lowering of the front implements, and movement of the device in the opposite direction will effect raising or lowering of the rear implements.

For a better understanding of the invention, reference may be had to the following description taken in connection with the accompanying drawings, in which:

Figure 1 is a side elevational view of a tractor with implements mounted thereon for adjustment, and with the power lifting means or arrangement of the present invention;

Figure 3 is a plan view of so much of the tractor as is shown in Figure 2;

Figure 4 is a detail elevational view of the step-by-step ratchet mechanism;

Figure 5 is a cross-sectional view taken on the line 5—5 of Figure 4; and,

Figure 2:
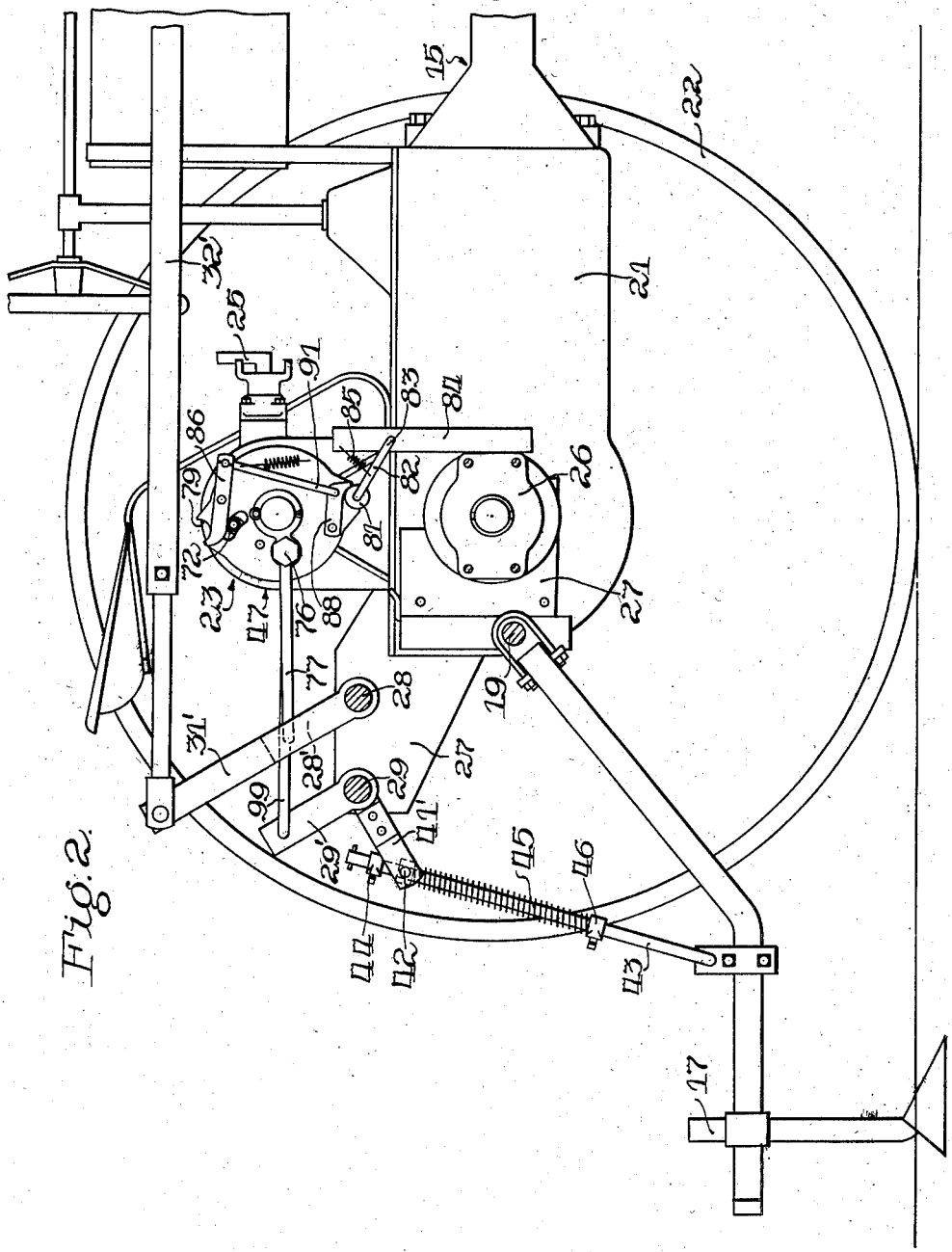
Figure 2 is an enlarged view similar to that shown in Figure 1, but only of the rear of the tractor to which the power lifting devices are attached.

Figures 6 to 10, inclusive, are diagrammatic showings of the two clutch mechanisms and the relative positions of the parts for different positions of the hydraulic lift vane and its output shaft, starting with the implements in their ground engaging positions, alternate raising of the front and rear implements, alternate lowering of the front and rear implements, back to the implements in their original ground engaging positions.

In Figures 1, 2 and 3, there is shown a tractor or implement supporting frame 15 having the usual front implements 16 and rear implements 17, pivotally mounted on the tractor, as indicated respectively at 18 and 19, for vertical movement to and from their ground engaging position. The tractor also has a transmission and differential housing 21 immediately over the rear wheels 22 of the tractor, on which is mounted a power lift device or means 23, preferably of the well known hydraulic vane type, whose output shaft 24 will be oscillated through 180 degrees more or less. This type of power lift device is operated from a supply of fluid, and its operation is controlled by the usual hand lever valve device 25. It will be apparent, however, as the description proceeds, that any other type of power means which gives to and fro motion and has a control for its operation might well be used; for instance, it might be a piston operated power lift device or some mechanically operated to and fro member deriving its power from the tractor power plant. Protruding from each side of the differential and transmission housing 21 are rear axle housing 26, each of which have connected to them rearwardly extending bracket members 27. These bracket members provide support for transversely extending rock-shaft members 28 and 29, and having their ends journaled therein. The rock-shaft 28 has two lever arms 31 and 31', each of which is connected, respectively, by means of forwardly extending lift pipes 32 and 32', one on each side of the tractor to their respective lifting levers, only one of which is shown, as indicated at 33. The lifting lever 33 is adapted to pivot about a pivot point 34 to effect elevation of the forward end of the longitudinally extending lifting pipe 32' to raise the front implements 16 about their pivot 18 by means of a lifting link 35 pivotally connected to the implements 16 and to the lifting pipe 32' by a collar member 36 adjustably secured to the lifting link and adapted to cooperate with a laterally extending lug portion 37 on the push pipe. The link 35 may slide through the lug 37, but is prevented from doing so by means of a pressure spring 38 carried by the lifting link 35 and adapted to apply pressure to the lifting link 35 through collar member 39 adjustably secured to the link. The spring 38 engages the lug 37 of the lifting pipe 32' at its upper end and tends to maintain the implements 16 in their ground engaging positions.

On the rear rock-shaft 29 there are secured two rearwardly extending lever arms 41 and 41', the outer ends of which contain a trunnion 42 through which a rear lifting link 43 extends. The link 43 is pivotally connected at its lower end to the rear implement structure 17 and is slidable through the trunnion 42, but retained for lifting purposes by means of an adjustable collar 44. When the arms 41 are in the position shown in Figure 1, the rear implements are held down in their ground engaging position by means of a pressure spring 45 disposed on the link member between an adjustable collar 46 and the trunnion 42.

Rigidly secured or mounted on the outer ends of the power lift output shaft 24 are front and rear step-by-step rotary ratchet clutch mechanisms or means 47 and 48. One of these mechanisms will now be described. Referring to Figures 4 and 5, the mechanism, being shown in detail, comprises generally an input member 49 having radially extending lug portions 51 and 52 and an output member 53 having a pawl 54 and a crank connection 55. The input member 49 has a hub portion 56 adapted to be keyed, as indicated at 56', to the power lift output shaft 24 and rotatable therewith. Extending radially from its hub portion 56, the member 49 is concaved and has a peripheral, flanged portion 57 extending inwardly toward the outer member 53. The lug portions 51 and 52 are spaced substantially at 180 degrees apart and extend radially inwardly from the flanged portion 57. These projections are shaped to cooperate with roller members carried by the outer member 53, to be later described.

The outer member 53 also has a hub portion 58 adapted to be journaled on the hub portion 56 of the inner member 49 and retained thereon by means of a washer 59 and a cotter pin 60, extending through the outer end of the hub portion 56 of the inner member 49. The outer member 53 is concaved toward the inner member 49 and has a peripheral, flanged portion 61 extending toward the flanged portion 57 of the inner member 49 and overlapping therewith. The pawl member 54 is pivotally connected within the outer member 53, as indicated at 62, and has a pawl roller 63 adapted to cooperate with either of the lug portions 51 or 52. The pawl roller 63 is maintained against the projections and against the inner face of the flange 57 of the inner member 49 by means of a spring 64 connected to a depending arm portion 65 on the pawl and to the outer member 53, as indicated at 66. This spring 64 tends to swing the pawl 54 about its pivot 62 on the inner member and thereby retain the roller 63 against the inside of the flange 57 and its lug portions 51 and 52 of the inner member 49.

In order to keep the outer member from overrunning during lowering of the implements, there is provided a second ratchet roller 67 adapted to engage the opposite faces 51a and 52a, respectively, of the lug portions 51 and 52 from the faces of the lug portions engaged by the roller 63. This roller 67 is carried by a roller arm 68 pivoted at 69 on the outer member 53. The roller is fixed to the free end of the arm 68 by rivet or bolt means 71. The means 71 also carries an additional roller 72 on the opposite end thereof, which projects through an arcuate slot 73 in the member 53 for movement therein about its pivot 69. A compression spring 74 engages the arm 68 and tends to pivot the same counter-clockwise about its pivot 69 to maintain the roller 67 against the flange 57 of the inner member 49 and in engagement with the lug portions 51 and 52, when not restrained from doing so by means to be later described.

The outer member 53, as mentioned before, has a crank arm portion 55, which is offset from its hub 58. This portion is preferably located circumferentially on the outside of the member 53 in proper relationship to other parts to be later described. The portion 55 has means, such as a hollow threaded portion 75 adapted to have a bolt 76 to be screwed down over a pitman link 77 to pivotally retain the same on the outer member 53. The lug portions 51 and 52, as above described, are preferably 180 degrees apart. The outer member 53 has notched portions 78 and 79, which are also spaced 180 degrees apart on the same. As shown in Figure 4, the ratchet mechanism is in one of its positions prior to lifting and there is an angular relationship between the notches of the outer member 53 and the lug portions 51 and 52 of the inner member 49.

A locking roller 81 is carried by a spring-biased arm 82 swingable about a pivot 83 on an upstanding bracket member 84, rigidly secured to the tractor. A spring 85 connects the roller arm 82 with the upper end of the bracket 84, tending to draw the roller arm 82 and its roller toward the end of the bracket. The function of the roller 81 is to lock the outer member 53 and its connected implement in one of its two positions. It should be noted that the angular relationship of this roller 81 and the notches is offset to the vertical plane and such that, when the outer member 53 is rotated in a clockwise direction, it may readily and automatically force out the locking roller 81 from its notch and permit rotation of the outer member. In referring to Figure 1, it should be seen that the front implements have a pressure spring 38, the function of which is to maintain the implements in their ground engaging position. As the tractor and implement travel for cultivation, the implements 16 tend to lift out of the ground engaging position and are only maintained therein by these springs 38. It should thus be seen that a force will be imparted through the spring 38 against the lug 37, which will tend to rotate the lifting arm 33 clockwise; pulling the lever arm 31' of the rock-shaft with it by means of the lifting pipe 32'. This in turn inparts a pressure force to the link 77, which is connected to an arm 28' rigidly secured to the rock-shaft 28. This force will be in a direction toward the ratchet mechanism, and, since the crank portion 55 is offset angularly with respect to a horizontal plane through the ratchet mechanism, a counter-clockwise force will be applied to the outer member and against the locking roller 81. The locking roller 81, when in the notch 79, thus serves to lock the front implement in its ground engaging position.

The outer member 53 has also pivoted thereon a lever member 86 at a pivot point 87, and a lever 88 at a pivot point 89. The free ends of these levers are adapted to swing flush with the notch portions 78 and 79, respectively, and into the path of the roller 81 when the same is in its locked position in either the notch 78 or 79. The levers 86 and 88 are interconnected by an S-shaped link 91, having a threaded portion 92 adapted to be screwed into engagement with the free end of the lever 88 and a reversible extending end portion 93 adapted to fit in a hole in the lever 86 and retained therein by a cotter pin 94. The lever 86 also cooperates with the roller 72 extending through the slot 73 of the outer member 53. If either of the levers 86 or 88 is released by removal of the locking member 81 from its notches, the roller arm 68 will be permitted to rotate about its pivot 69, due to the force of its cooperating compression spring 74, and the roller 67 will thus be permitted to engage either of the lug portions 51 or 52. A spring 95 connects the S-shaped member 91 with the outer member 53, as indicated at 96, and is so arranged to assist in the operation of the levers 86 and 88 and may tend to aid in the throwing out of the locking roller 81, when rotation of the outer member 53 is started. The spring 74 of the roller arm 68 assists the spring 95 in this regard. As shown in Figure 4, the roller arm 68 will move in a counter-clockwise direction, with the roller 72 cooperating with a convexed face portion 97 to push the lever 86 out of the way, so that the roller 67 may engage the flange portion 57 in readiness to cooperate with the face portion 51a of the lug portion 51, should there be an overrunning of the outer member during the operation of the ratchet mechanism. The roller 67 will be thrown out of its engagement by means of the same portion 97 of the lever 86 when the locking roller 81 seats in either of the notch portions 78 or 79. The roller 67 has little function during the raising of the implements, as the roller 63 of the pawl 54 will have considerable force applied thereto from the lug portion 51 of the inner member 49.

The operation of one of these ratchet mechanisms by the power lift shaft 24 will now be described. The ratchet mechanism 47, as shown in Figure 4, is arranged for operation of the forward implements. The figure shows the ratchet mechanism 47 when the implements are in their ground engaging position and with the locking roller 81 serving to lock the same in the manner above described, there being force applied to the crank portion 55 by the link 77 tending to rotate the outer member 53 counter-clockwise and toward the roller 81. Assuming now that the operating valve 25 is operated, the shaft 24 of the lifting device 23 will be rotated clockwise, and the inner member 49, through its lug portion 51, will swing the ratchet roller 63 and the outer member 53 through substantially 180 degrees until the locking roller 81 seats in the notched portion 78, thereby raising the front implements and inner and outer members assuming the position shown in Figure 7. The locking roller 81, upon seating in the notched portion 78, will be rigidly retained therein by the weight of the implements, applying force to the outer member in the same counter-clockwise direction as above described when the implements were in their ground engaging position. In Figure 7, at the left thereof, the position of the parts of the mechanism is shown with the front implements raised. When the turning movement started, the roller 81 was thrown out of the notch 79, permitting the lever arms 86 and 88 to be rotated about their respective pivots for allowing the roller 67 to engage the flange portion 57 of the input member 49. In this movement, the roller 67 had no particular function, since there was sufficient pressure applied to the roller 63 by the lug portion 51.

Since the lug portions 51 and 52 on the inner member 49 are located 180 degrees apart, whatever oscillation of the inner member 49 and shaft 24 more than 180 degrees would be lost, the outer member in its final effect turning but 180 degrees from one notched portion to the other. The members 49 and 53 in locked condition may be powered so that the notch 78 will go slightly by the roller 81, but, upon release of power, they would slide back by virtue of the weight of the implement and lost motion in the hydraulic mechanism upon release of fluid pressure, so that the notch 78 seats definitely over the roller 81. There will be no further oscillation of the outer member 53 until the inner member returns for connection of the roller 63 with the lug portion 52, as shown in Figure 8. The vane of the lifting member rotates counter-clockwise upon operation of the valve 25 to another setting thereof, and the roller 63 will roll over the lug portion 52a for connection with the portion 52, as shown in Figure 8.

The ratchet mechanism is now in position to lower the implement to its ground engaging position. The valve 25 will again be operated and the lug 52 of the inner member will carry the roller 63 and outer member 53 to the position shown in Figure 9, thus lowering the implement. It is in this operation that the roller 67 has particular function. The weight of the implement will tend to cause the roller member 63 to run ahead of the inner member, but this is prevented by connection of the roller 67 with the portion 52a. The function of the lug portion 52 during the lowering of the implement is more or less to positively carry the outer member over or to merely start the operation so that the locking roller will be lifted out of its notched portion 79. The roller 81 has sufficient force upon seating in one of the notched portions to remove the roller 67 from its contact from the flange portion 57 of the inner member 49.

While the description thus far has been made with reference to the ratchet mechanism 47 for the front implements, it should be understood that the ratchet mechanism 48 for the rear implements is exactly identical and operates the same. Since the ratchet mechanism 48 for the rear implements is mounted with its outer member facing to the left instead of to the right of the tractor, as for the front implement, there will be alternate lifting and lowering of the rear implement on the return oscillation of the power lift. The arrangement of these mechanisms, in this manner, gives the consecutive or alternate operation of the respective implements, which is the primary object of this invention.

The rear ratchet mechanism 48 is connected to an arm 29' on the rock-shaft 29 by means of a link 99. The total linkage connecting the implements with the rear implement structure 17 is such as to give the same effect to the ratchet mechanism as above described in connection with the front ratchet mechanism 47. When the rear implement is down, there is a tendency for it to leave the ground engaging position and force will be applied through the pressure spring 45 to the link 99 to maintain the rear mechanism against its locking roller 81. The weight of the rear implement structure will hold the locking roller 81 in its cooperating notch when the implement is raised.

Reference should now be had to Figures 6 to 10. In these figures, the relationship of the front and rear ratchet mechanisms with reference to the power lift vane is shown diagrammatically to illustrate the relative position of their incidental parts at different times during the raising and lowering of the implements. In Figures 6 and 10, both of these ratchet mechanisms are shown located with both the front and rear implements in their ground engaging position, the vane of the power lift is to the left, and the mechanism 47 is ready to lift the front implements. The vane oscillates clockwise to the right to the position shown in Figure 7 to effect lifting of the front implements. The rear ratchet mechanism 48 does not effect lifting by oscillation of the vane to the right but simply ratchets the roller 63 and places it in position to bite the lug portion 51 of its outer member. Such raising of the forward implement takes place as the tractor approaches the end of the field and is effected by operation of the valve 25 of the power lift. Now that the front implement is raised, the rear implements having proceeded the length of the tractor are now ready to be raised. The valve 25 thus swings back to effect operation of the vane to the left to effect raising of the rear implement by its mechanism 48. While this is being done, the mechanism 47 or the front implements has ratcheted and the position of the mechanisms will be that shown in Figure 8. While the front mechanism 47 is ratcheted, it has prepared itself for another bite for effecting lowering of the same when it is desired to lower the implements upon starting the tractor through a new row in the field. For this operation, the valve 25 is again operated and the front implement will be lowered and the mechanisms take the position shown in Figure 9. The vane of the power lift device is moved again to the right in a clockwise direction to effect operation of the front implement. The valve 25 must again be moved to effect lowering of the rear implement and swinging of the vane to the left as soon as the rear implement has come into the field. The implements are now both in their ground engaging positions, as shown in Figures 6 and 10.

It should now be seen that there has been provided by the particular mechanism and the arrangement with the implements, as above described, an arrangement wherein a consecutive or alternate lifting of the front and rear implements may be effected by the use of a power lift device of the hydraulic type or of any such power lift device having a member adapted to be moved to and fro. The particular ratchet mechanism, shown and described, has been particularly designed for operation with the power lift devices of the to and fro type.

It shall be understood that while various specific changes might be made in the construction shown and described therein, that such changes shall be made without departing from the spirit and scope of the present invention as defined in the appended claims.

What is claimed is:

1. In combination, an implement supporting frame, an implement mounted for movement on the frame, a rock-shaft, a ratchet clutch mechanism comprising an inner clutch member secured to said rock-shaft and having lug portions spaced substantially 180 degrees apart thereon, and an outer clutch member connected with the implement having a pawl adapted to coact with the portions of the inner member, locking means cooperating with the outer clutch member for positively retaining said implement in two positions, and power actuated means operative to rock said rock-shaft.

2. In combination, a tractor having an implement mounted for movement thereon, a rock-shaft, a rotary ratchet mechanism comprising two members, one of which has lug portions thereon spaced substantially 180 degrees apart, the other member having a pawl adapted to coact with the portions of the first member, one of the members being connected to the rock-shaft and the other being connected to the implement, locking means for retaining the implement in each of two positions on the tractor, and power actuated means operative to rock the rock-shaft.

3. In combination, a tractor, an implement mounted thereon for vertical adjustment between ground engaging and transport positions, a rock-shaft, a rotary ratchet mechanism comprising one member secured to the rock-shaft and having lug portions thereon spaced substantially 180 degrees apart, and another member connected with the implement and having a pawl adapted to coact with the lug portions of the first member, locking means associated with the member connected to the implement for positively retaining the implement in either of its two positions, and power actuated means operative to rock said rock-shaft.

4. In combination, an implement carrying frame, an implement mounted for movement thereon from one position to another, a rock-shaft, a rotary ratchet mechanism comprising lug portions thereon, an another member connected with the implement and having a pawl adapted to cooperate with said lug portions thereon, means for preventing overrunning of the second member while moving the implement to one of its positions, and power actuated means operative to rock said rock-shaft.

5. In combination, a tractor, an implement mounted on the tractor for vertical adjustment between raised and lowered positions, a rock-shaft, a rotary ratchet mechanism comprising a member connected to the rock-shaft and having lug portions thereon and another member connected with the implement and having a pawl adapted to cooperate with said lug portions, means for preventing overrunning of the second member while adjusting the implement from its raised position to its lowered position, and power actuated means operative to rock said rock-shaft.

6. In combination, a tractor, an implement mounted on the tractor for vertical adjustment between raised and lowered positions, a rock-shaft, a ratchet mechanism comprising a member connected to the rock-shaft and having lug portions thereon, another member connected to the implement and having a pawl adapted to cooperate with the lug portions of the first member, means for preventing overrunning of the second member while adjusting the implement from its raised position to its lowered position, means for positively locking the second member in either of its two positions, means to control the overrunning means, and power actuated means operative to rock the rock-shaft.

7. In combination, an implement supporting frame, implements mounted for movement thereon, an independent step-by-step ratchet clutch mechanism for each of the implements, comprising an input member and a coacting output member, the latter being connected with the respective implement and adapted to move intermittently in one direction to move the implement, and a to and fro power means common to the input member of each mechanism.

8. In combination, an implement supporting frame, implements mounted for movement on the frame, a member adapted to move to and fro, independent ratchet mechanisms for each implement operatively connected to said member, one of the mechanisms being operative upon movement of the member in one direction and the other being operative by movement of the member in the opposite direction, each implement and its respective ratchet mechanism being operatively connected together, and means for moving said member to and fro whereby consecutive movement of the implements is effected.

9. In combination, a tractor, implements mounted for vertical movement on the frame, a member adapted to move to and fro, independent ratchet mechanisms for each implement operatively connected to said member, one of the mechanisms being operative upon movement of the member in one direction and the other being operative by movement of the member in the opposite direction, each implement and its respective ratchet mechanism being operatively connected together, and means for moving said member to and fro whereby consecutive vertical movement of the implements is effected.

10. In combination, a tractor, implements mounted for vertical movement on the tractor, a rockable member, independent ratchet mechanisms for each implement operatively connected to said member, one of the mechanisms being operative upon rocking movement of the member in one direction and the other being operative by rocking movement in the opposite direction, each implement and its respective ratchet mechanism being operatively connected together, and power actuated means for rocking the rockable member whereby consecutive vertical movement of the implements is effected.

11. In combination, a tractor, front and rear implements mounted for vertical movement on the tractor, a rockable member, independent ratchet mechanisms for each implement operatively connected to said member, one of the mechanisms being operative upon rocking movement in one direction and the other being operative by rocking movement in the opposite direction, each implement and its respective ratchet mechanism being operatively connected together, and power actuated means for rocking the rockable member whereby consecutive vertical movement of front and rear implements may be effected.

12. In combination, a tractor, front and rear implements mounted for vertical movement on the same, a hydraulic vane lift device, having an oscillatory output shaft, independent ratchet mechanisms for each implement directly mounted on said output shaft, one of the mechanisms being operative upon oscillatory movement of the vane lift in one direction and the other of the mechanisms being operative upon oscillatory movement in the opposite direction, each implement and its respective ratchet mechanism being operatively connected together, whereby upon complete oscillation of the vane lift consecutive vertical movement of the implements is effected.

HIRAM P. SMITH.